(12) United States Patent
McDermid

(10) Patent No.: US 11,928,267 B2
(45) Date of Patent: Mar. 12, 2024

(54) APPARATUS FOR USER INPUT TO A COMPUTER USING HAND AND FINGER MOVEMENTS

(71) Applicant: William James McDermid, Niwot, CO (US)

(72) Inventor: William James McDermid, Niwot, CO (US)

(*) Notice: Subject to any disclaimer, the term of this patent is extended or adjusted under 35 U.S.C. 154(b) by 0 days.

(21) Appl. No.: 18/078,261

(22) Filed: Dec. 9, 2022

(65) Prior Publication Data

US 2023/0185383 A1 Jun. 15, 2023

Related U.S. Application Data

(60) Provisional application No. 63/332,249, filed on Apr. 18, 2022, provisional application No. 63/287,580, filed on Dec. 9, 2021.

(51) Int. Cl.
*G06F 3/0338* (2013.01)
*G06F 3/04817* (2022.01)

(52) U.S. Cl.
CPC ........ *G06F 3/0338* (2013.01); *G06F 3/04817* (2013.01); *G06F 2203/04806* (2013.01)

(58) Field of Classification Search
USPC .................................... 345/168, 169, 156
See application file for complete search history.

(56) References Cited

U.S. PATENT DOCUMENTS

| | | | | |
|---|---|---|---|---|
| 5,067,834 A | * | 11/1991 | Szmanda | F16M 11/28 400/489 |
| 5,167,596 A | * | 12/1992 | Ferber | A63B 21/00069 482/45 |
| 6,614,420 B1 | * | 9/2003 | An | G06F 3/0338 345/157 |
| 6,630,924 B1 | * | 10/2003 | Peck | G06F 3/011 345/169 |
| D703,764 S | * | 4/2014 | Griffith | G06T 15/20 D21/333 |
| 2008/0186279 A1 | * | 8/2008 | Van Dalen | G06F 3/0338 345/163 |
| 2012/0113034 A1 | * | 5/2012 | McDermid | G06F 3/0485 345/173 |
| 2013/0285917 A1 | * | 10/2013 | Ou | G06F 3/0227 345/169 |
| 2019/0022522 A1 | * | 1/2019 | Croft | G06F 3/0338 |

* cited by examiner

*Primary Examiner* — William Boddie
*Assistant Examiner* — Alecia D English

(57) ABSTRACT

An apparatus is provided for user input to a computer. The apparatus consists of movable left and right paddles connected to the ends of a tie bar by 3-axis gimbles. The paddles are shaped to facilitate holding the device and rotating the paddles while keeping a user's fingers and thumbs free to activate tactile key-switches positioned under them. The position of the gimbles relative to the tie bar cause the paddles to rest in a neutral position when the apparatus is pressed between a user's hands. The gimbles rotate off the neutral position based on a user's wrist position. Both the rotations of the paddles and the status of the key-switches are used to determine the input codes sent to a paired computer. A display on the paired computer shows left and right arrays of icons representing available inputs and highlights the inputs currently accessible by the user's fingers and thumbs based on the paddle positions.

10 Claims, 8 Drawing Sheets

APPARATUS FOR USER INPUT TO A COMPUTER USING HAND AND FINGER MOVEMENTS

CROSS REFERENCE TO RELATED APPLICATIONS

This application claims priority to U.S. provisional application 63/287,580 filed on Dec. 9, 2021, and provisional application 63/332,249 filed on Apr. 18, 2022, which are incorporated herein by reference.

This application is related to U.S. Pat. No. 8,810,536 filed by the same inventor on Nov. 2, 2011, and U.S. Pat. No. 11,281,309 filed by the same inventor on Dec. 31, 2020, which are incorporated herein by reference.

This application is also related to U.S. patent application Ser. No. 14/526,369 filed by the same inventor on Jun. 7, 2016, and provisional patent application 63/296,123 filed by the same inventor on Jan. 3, 2022, which are incorporated herein by reference.

BACKGROUND OF THE INVENTION

1. Field of the Invention

This invention relates to a method for human input to and control of a computer using hand and finger movements.

2. Statement of the Problem

A common user interface for input to a computer employs a keyboard and a pointing device such as a mouse, trackpad, or touchscreen. These devices require a horizontal surface to be used effectively limiting their utility in mobile applications.

A hand-held key-paddle input device, like those disclosed in the patents and patent applications referenced above, consists of two paddles, one for each hand, connected to each end of a tie bar via 2-axis pivots. 10 key-switches, one under each finger and each thumb, take on key definitions based on the rotational position of the paddles around the pivots. To allow all the keys of a keyboard to be entered, these devices require discrimination among multiple steps in the rotational position of the paddles.

A virtual key-paddle input device senses wrist and finger movements to provide inputs to a paired computer using cameras or other sensing mechanisms. This solution lacs the kinesthetic and tactile feedback provided by a hand-held device leading to errors and unintended activations.

SUMMARY OF THE SOLUTION

The present invention solves the above and other problems with a key-paddle device by adding a third axis of motion and detection in the pivots connecting the paddles to the tie bar.

The paddles on a key-paddle device track the wrist positions of the user holding the device. Human wrists have three rotational axes: adduction/abduction, extension/flexion, and pronation/supination. The key-paddle devices in the above referenced patents allow for the first two of these wrist rotations. Allowing for the pronation/supination rotation affords 270 distinct key events where sensors tracking the paddle rotations need only discriminate between three positions: neutral, clockwise rotation, and counterclockwise rotation in each of the axes.

3 positions (adduction, neutral, abduction)*
3 positions (flexion, neutral, extension)*
3 positions (pronation, neutral, supination)*
5 digits (4 fingers, 1 thumb)*
2 hands=270

270 distinct key events are more than enough to provide for all the keys of a traditional computer keyboard, including keys' shift, control, and alternate states.

ASPECTS

An aspect of the invention is how the paddles have a notch on the front at the top to form a recess for the user's thumbs. A key is positioned on the horizontal surface at the bottom of the recess and is activated by the thumb pressing down. The key location frees the thumb to press against the vertical surface of the recess to cause the paddle to rotate back.

Preferably the recesses and keys are long to accommodate the large variance in the length of users' thumbs.

Another aspect of the invention is how four keys on the back of each of the paddles, one for each finger, are elongated to accommodate the large variance in the length of users' fingers.

Preferably the finger keys on the back can overlap the thumb key on the front to further accommodate the large variance in the size of users' hands.

Another aspect of the invention is how a wedge is added to the back of the paddles to contact the user's palm. A steep drop-off of the wedge where it encounters the elongated finger keys allows the palm to press against the wedge surface to cause the paddle to rotate forward without causing the fingers to activate the finger keys.

Another aspect of the invention is how the edge of the paddle in the user's palm is convex to push the pivot into the well of the palm and present surfaces at the top and the bottom of the edge for the palm near the index fingers and pinky fingers, respectively, to press against the edge to cause the paddle to rock down and up, respectively.

An aspect of the invention is how a third axis of motion is added to the pivots connecting the paddles to the tie bar of a key-paddle device. Preferably, the pivots are 3-axis gimbals. Alternatively, the pivots can be ball and socket joints or torsion bars.

Another aspect of the invention is how flexion of a wrist effects a yaw-in rotation of a paddle, extension of a wrist effects a yaw out rotation of a paddle, adduction of a wrist effects pitch down rotation of a paddle, abduction of the wrist effects a pitch up rotation of a paddle, pronation of a wrist effects a roll in of a paddle, and supination of a wrist effects a roll out rotation of a paddle.

Another aspect of the invention is how the three axes of motion within a gimble intersect at a common point. The edges of the left and right paddles that contact a user's left and rights hands are aligned with the left and right gimble intersect points, so no moment forces are applied to paddles when the invention is pressed between a user's hands.

Another aspect of the invention is how discriminating between just three rotational positions in each of the three axes affords 270 unique activation events. Preferably these three rotational positions are a no torque neutral position, a clockwise torque to effect a rotation to a stop, and a counterclockwise torque to effect a rotation to a stop. Preferably the rotations are only slight movements off the neutral position. Preferably the torque and stop are implemented with switches able to provide tactile feedback.

Another aspect of the invention is how the axes of rotation of the paddles are at a non-zero angle relative to the horizontal tie bar, so the tie bar remains stationary when the paddles are rotated. Preferably, no axis is at an angle less than 45 degrees relative to the horizontal tie bar when the paddles are in the neutral position.

Another aspect of the invention is how the paddles can be unlocked from their orientation relative to the tie bar so they can be folded in to align with the tie bar to make the invention easier to store and transport.

Another aspect of the invention is how the tie bar can be unlocked to allow it to rotate around a pivot near its midpoint and then telescope in to further compact the invention to make it easier to store and transport.

Another aspect of the invention is how a mount for a smartphone can be slid along and rotated about the tie bar.

Another aspect of the invention is how the invention and paired computer operate in a key input mode or a pointer input mode.

Another aspect of the invention is a pressure switch in the tie bar that is activated by applying an increased force pressing the paddles together. Preferably, activation of the pressure switch toggles the invention between key input mode and pointer input mode.

When operating in key input mode, two paddles, three yaw positions, three pitch positions, three roll positions, and five digits allow for 2*3*3*3*5=270 distinct activation events, enough for all keyboard keys in both their base and shifted states thereby eliminating the need for multi-key sequences.

Another aspect of the invention is how a map on a display of a paired computer shows the icons for the possible activation events and highlights those currently selectable by flexion of a thumb or finger. This interactive icon map is instrumental in training a user on the sequence of movements necessary to select a certain icon.

Preferably, the icon map is divided in half and located along the left and right periphery of the display showing selections for the left and right hands, respectively. By putting the map on the sides and out of the way, the map can be largely ignored but is available for reference should the user need it.

When operating in pointer input mode, paddle positions are used to control the pointer and 10 activation events are possible, one for each finger and thumb.

Preferably, a pitch up of one paddle moves the pointer up at a first rate and a pitch up of both paddles moves the pointer up at a faster rate; a pitch down of one paddle moves the pointer down at a first rate and a pitch down of both paddles moves the pointer down at a faster rate.

Preferably, a yaw in of the right paddle or yaw out of the left paddle moves the pointer left at a first rate and yaw in of the right paddle and yaw out of the left paddle moves the pointer left at a faster rate; a yaw in of the left paddle or yaw out of the right paddle moves the pointer right at a first rate and yaw in of the left paddle and yaw out of the right paddle moves the pointer right at a faster rate.

Preferably, a roll in of one paddle zooms the display in at a first rate and roll in of both paddles zooms the display in at a faster rate; a roll out of one paddle zooms the display out at a first rate and roll out of both paddles zooms the display out at a faster rate.

DESCRIPTION OF THE DRAWINGS

The above and other advantages and features of the invention may be better understood from a reading of the detailed description taken in conjunction with the drawings. The same reference number represents the same element on all drawings.

DETAILED DESCRIPTION OF THE INVENTION

FIGS. 1-7 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1A:
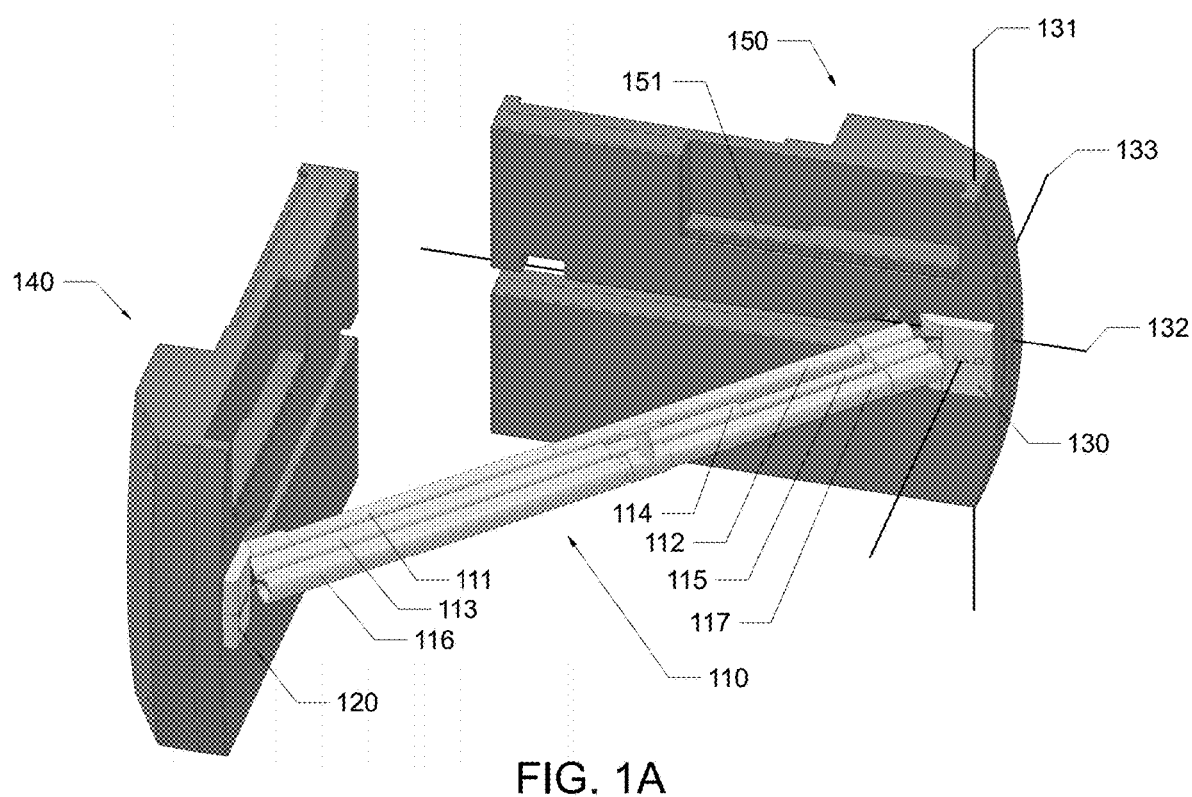
FIGS. 1A and 1B are front and back isometric views of the invention in the use configuration.
Figure 1B:
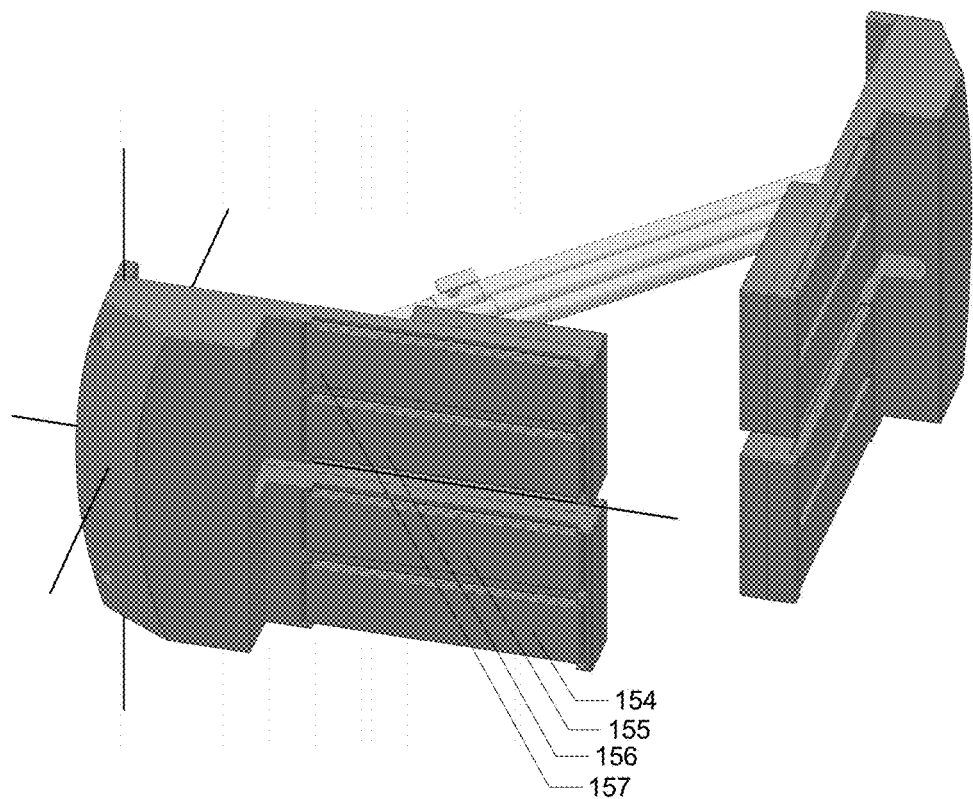

FIGS. 1A and 1B show back and front isometric views of the invention, respectively. Left key paddle 140 is connected to tie bar 110 via gimble 120 and fits in the user's left hand. Right key paddle 150 is connected to tie bar 110 via gimble 130 and fits in the user's right hand. Key paddle 150 contains key 151 for a user's thumb, key 152 for a user's index finger, key 153 for a user's middle finger, key 154 for a user's ring finger, and key 155 for a user's pinky finger. Key paddle 140 has the same configuration of five keys for the thumb and fingers of a user's left hand.

Tie bar 110 is comprised of a back tube, a center tube, and a front tube. The back tube is comprised of two pieces 111 and 112, the center tube is comprised of three pieces 113, 114, and 115, and the front tube is comprised of two pieces 116 and 117.

Right gimble 130 affords three axes of rotation. Axis reference 131 shows how paddle 150 yaws in and out relative to tie bar 110. Axis reference 132 shows how paddle 150 rolls in and out relative to tie bar 110. Axis reference 133 shows how paddle 150 pitches up and down relative to tie bar 110. Tie bar 110 remains stationary during all rotational movements of paddle 150 because it is not aligned with any of the axes.

Figure 2A:
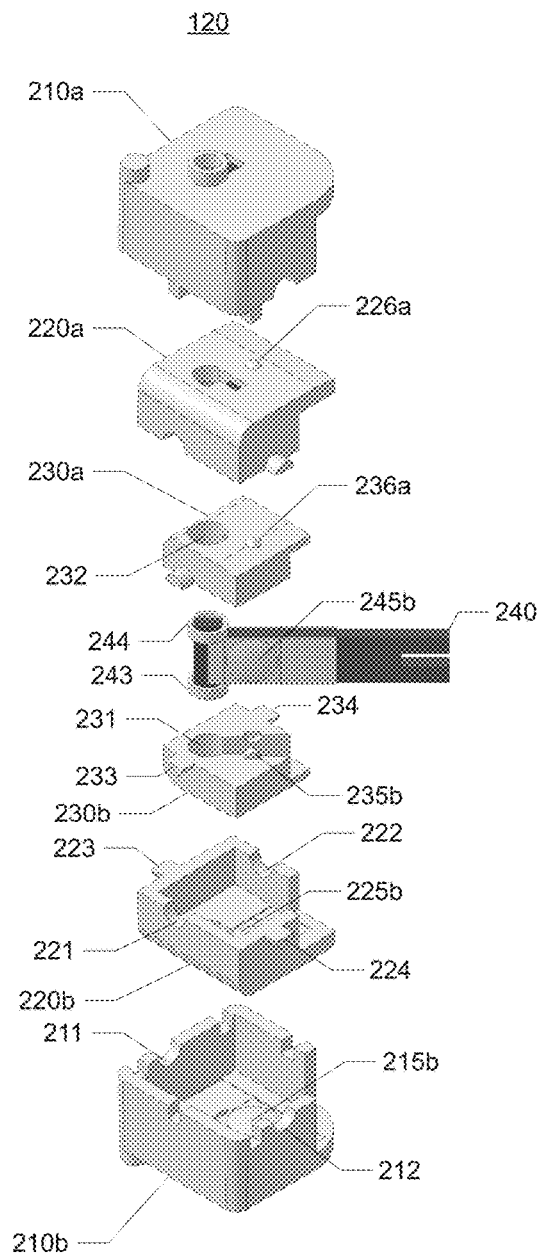
FIG. 2A and FIG. 2B are alternative isometric exploded views of the same gimble.
Figure 2B:
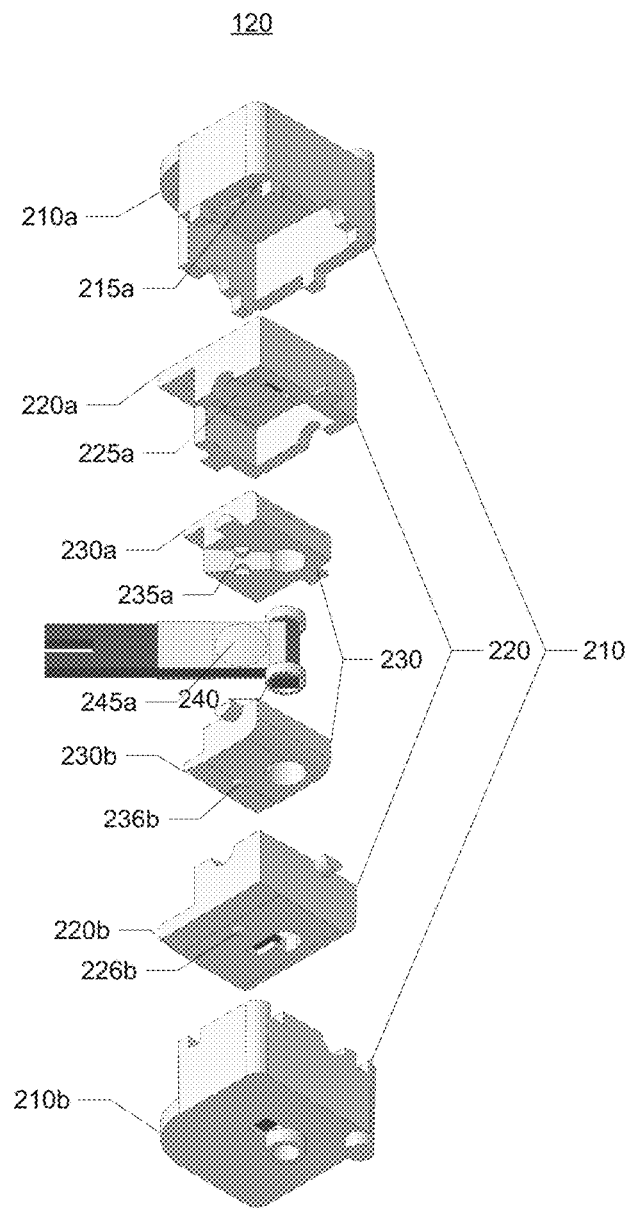

FIG. 2A shows an exploded isometric view of left gimble 120 from the front/top. FIG. 2B shows an exploded isometric view of the same gimble from the back/bottom. Gimble 120 is comprised of four layers. The three outer layers are comprised of top and bottom halves which are mirror images of one another. The inner most layer connects the yaw axis 243-244 to the tie bar via bar 240. Bar 240 contains dome switch 245b on the front side and dome switch 245a on the back side. The next layer is the roll layer 230 comprised of halves 230a and 230b. Roll layer 230 connects the roll axis 233-234 to the yaw axis captured in holes 231 and 232. Actuator 235b depresses dome switch 245b when bar 240 rotates in a clockwise direction around axis 243-244 and actuator 235a depresses dome switch 245a when bar 240 rotates in a counterclockwise direction around axis 243-244 to determine the yaw state of gimble 120. The next layer is the pitch layer 220 comprised of halves 220a and 220b. Pitch layer 220 connects the pitch axis 223-224 to the roll axis captured in holes 221 and 222 and contains dome switch 225b on the bottom half and dome switch 225a on the top half. Actuator 236b depresses dome switch 225b when roll layer 230 rotates in a clockwise direction around axis 233-234 and actuator 236a depresses dome switch 225a when roll layer 230 rotates in a counterclockwise direction around axis 233-234 to determine the roll state of gimble 120. The outer layer 210 is comprised of halves 210a and 210b. The outer layer 210 connects the left paddle to the pitch axis captured in holes 211 and 212 and contains dome switch 215b on the bottom half and dome switch 215a on the top half. Actuator 226b depresses dome switch 215b when pitch layer 220 rotates in a clockwise direction around axis 223-224 and actuator 226a depresses dome switch 215a when pitch layer 220 rotates in a counterclockwise direction around axis 223-224 to determine the pitch state of gimble 120.

Figure 3A:
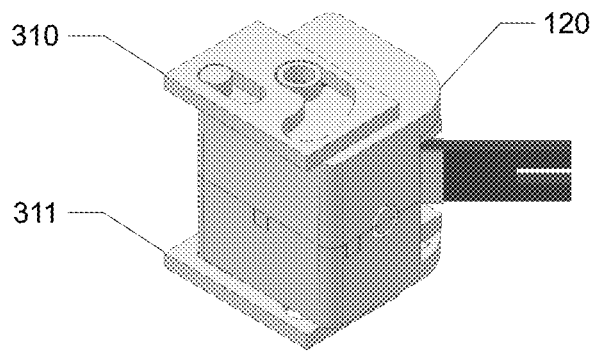
FIG. 3A through 3C show isometric views of a gimble in a paddle mount.
Figure 3B:
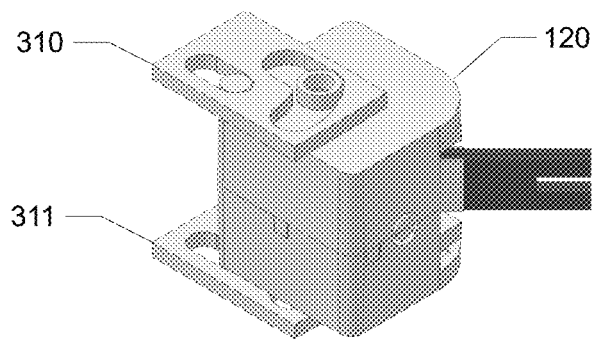
Figure 3C:
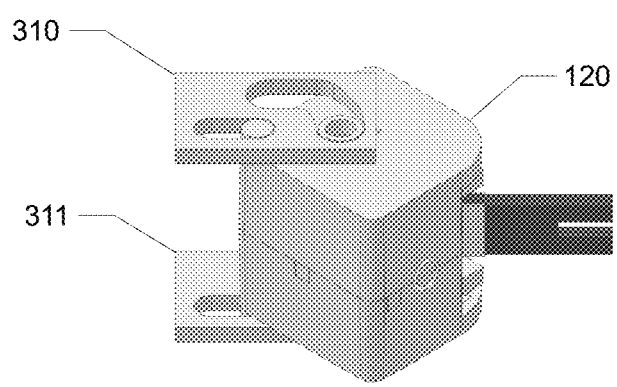

FIG. 3A through 3C show paddle mounts 310 and 311. Paddle mounts 310 and 311 are affixed to paddle 140 and hold gimble 120. FIG. 3A shows the orientation of the gimble 120 in mounts 310 and 311 when the paddles of the invention are in a use mode. FIG. 3B shows gimble 120 in paddle mounts 310 and 311 when the paddles of the invention are pulled apart to unlock the gimble, so it is free to rotate. FIG. 3C shows gimble 120 in paddle mounts 310 and 311 when the paddles are rotated into a folded mode.

Figure 4A:
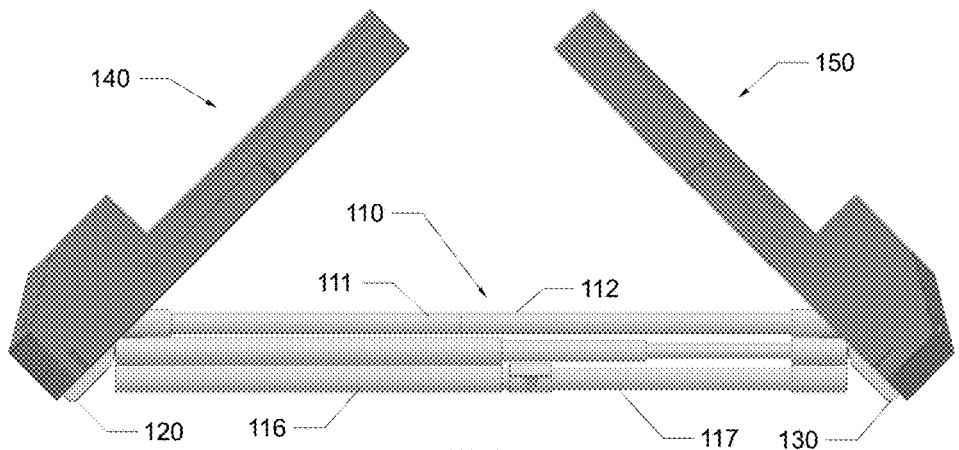
FIG. 4A through 4D show the invention transitioning from use mode to folded mode.

FIG. 4A shows a top view of the invention in use mode. Tie bar tube 111 is inserted into tie bar tube 112 up to a stop. Tie bar tube 117 is inserted into tie bar tube 116 up to a stop. The stops keep paddles 140 and 150 from coming closer as they are pressed together by the user.

Figure 4B:
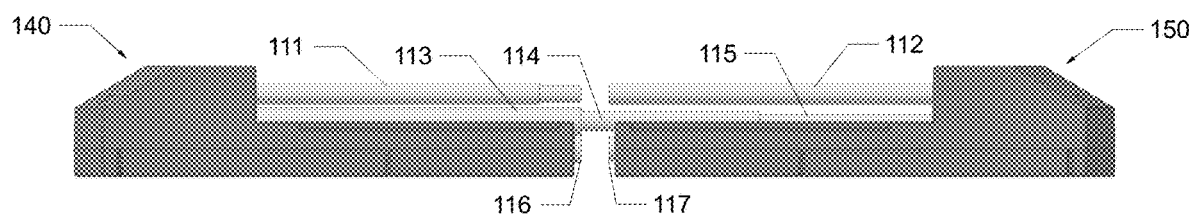

FIG. 4B shows a top view of the invention in a first step towards folding the invention. Paddles 140 and 150 are pulled apart to unlock gimble 120 from paddle 140 and gimble 130 from paddle 150 thereby allowing the paddles to rotate in and align with tie bar 110. Pulling the paddles apart also disengages tie bar tube 111 from tie bar tube 112, and tie bar tube 117 from tie bar tube 116. Telescoping tie bar tubes 113, 114, and 115 keep the paddles from pulling apart further.

Figure 4C:
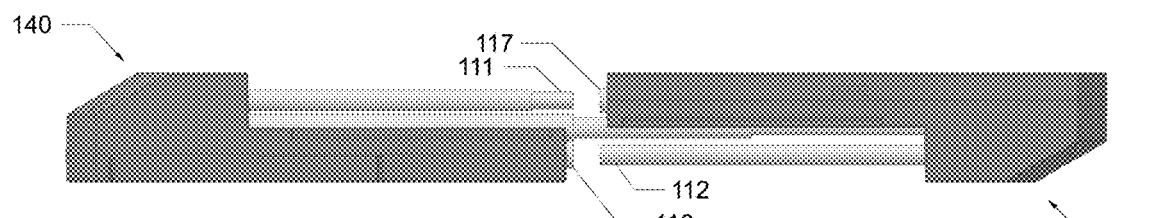

FIG. 4C shows a top view of the invention in a second step towards folding the invention. Paddle 150 is rotated 180 degrees relative to paddle 140 by pivoting around telescoping tie bar tubes 113, 114, and 115.

Figure 4D:

FIG. 4D shows a top view of the invention in folded mode. Tie bar tube 112 slides into tie bar tube 116, tie bar tube 111 slides into tie bar tube 117, and telescoping tie bar tubes 113, 114, and 115 slide into one another. Paddles 140 and 150 nest together.

Figure 5:
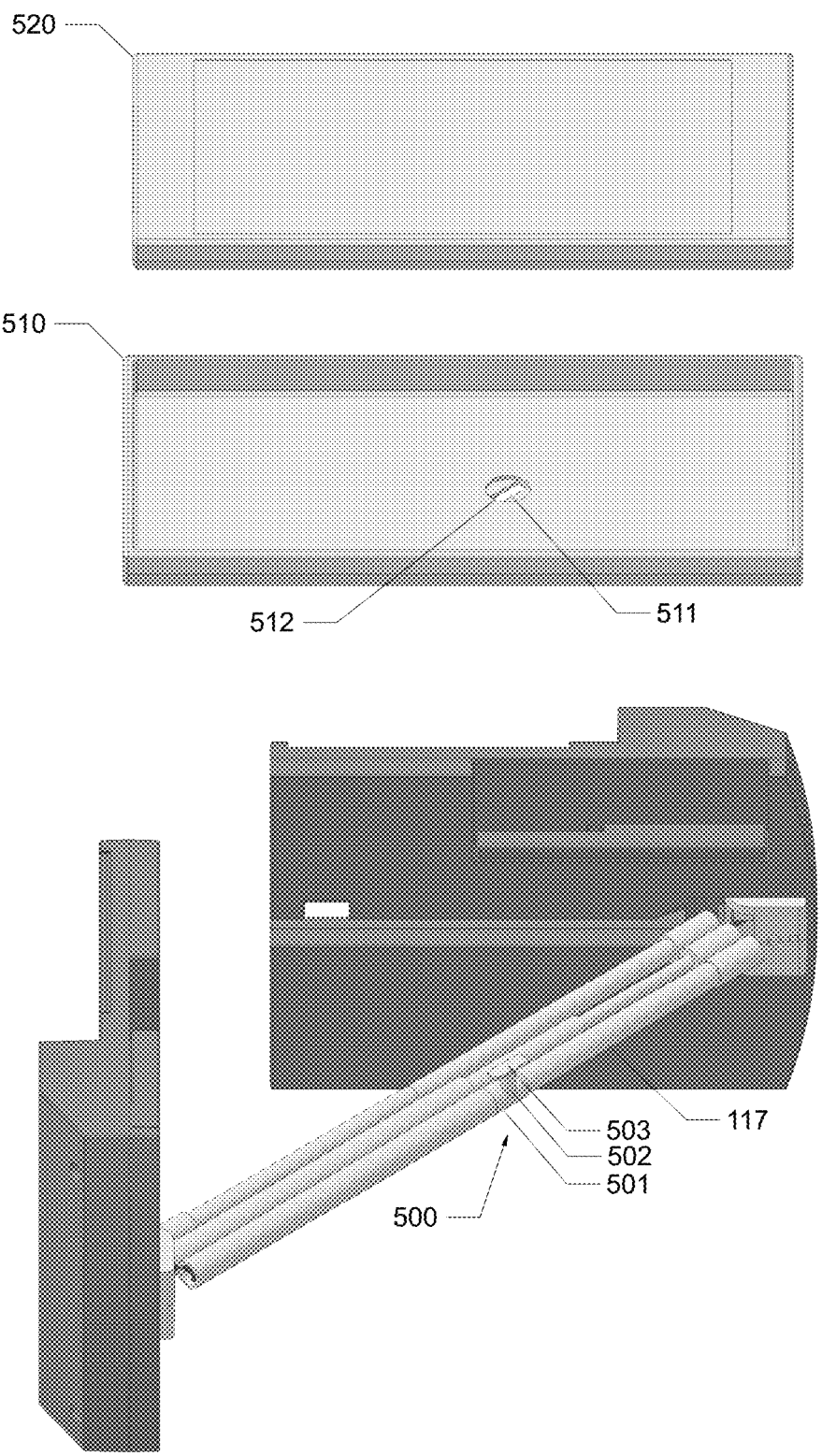
FIG. 5 shows an isometric exploded view of how a smartphone and case attach to the invention.

FIG. 5 shows an exploded isometric view of how smartphone 520 is attached to the invention by way of smartphone case 510. Smartphone mount 500 is comprised of post 502 connecting sleeve 501 to flange 503. Sleeve 501 is free to slide along and rotate about tie bar tube 117. Flange 503 passes through hole 511 in the back of case 510. Case 510 is free to rotate around post 502 because flange 503 is free to rotate within relief area 512.

Figure 6A:
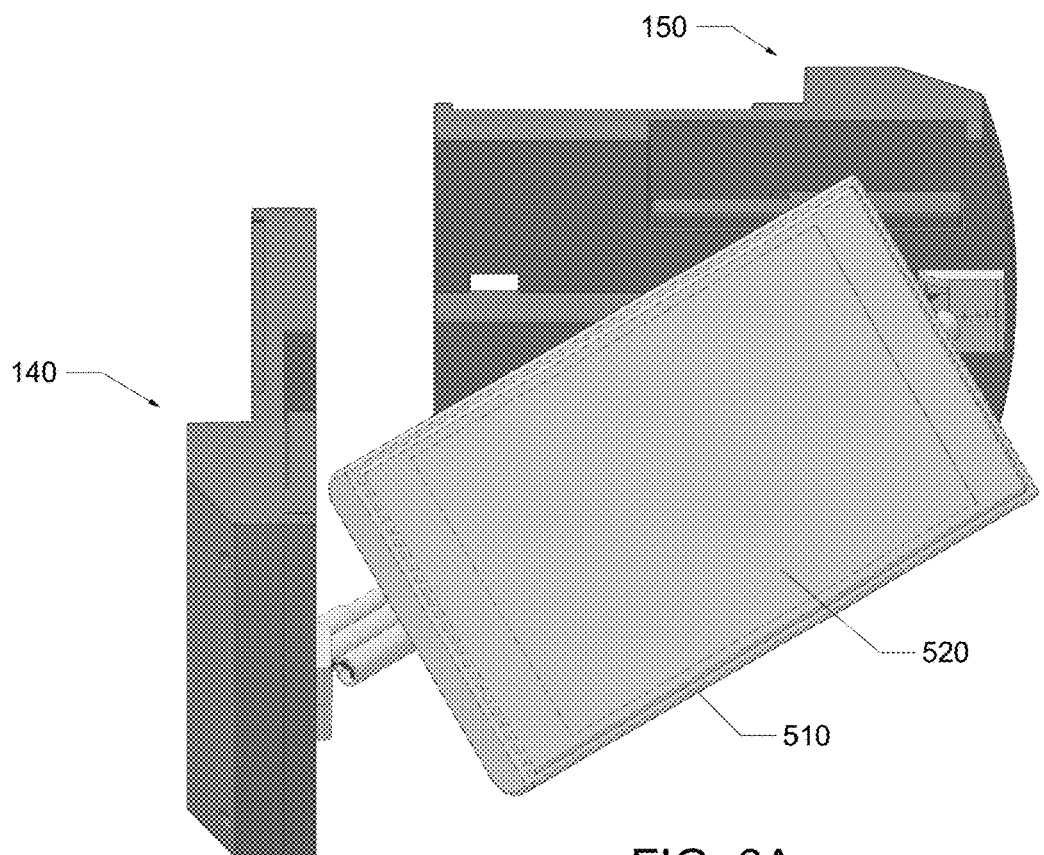
FIG. 6A shows the invention with a smartphone attached while in the use mode and FIG. 6B shows the invention with a smartphone attached while in the folded mode.
Figure 6B:
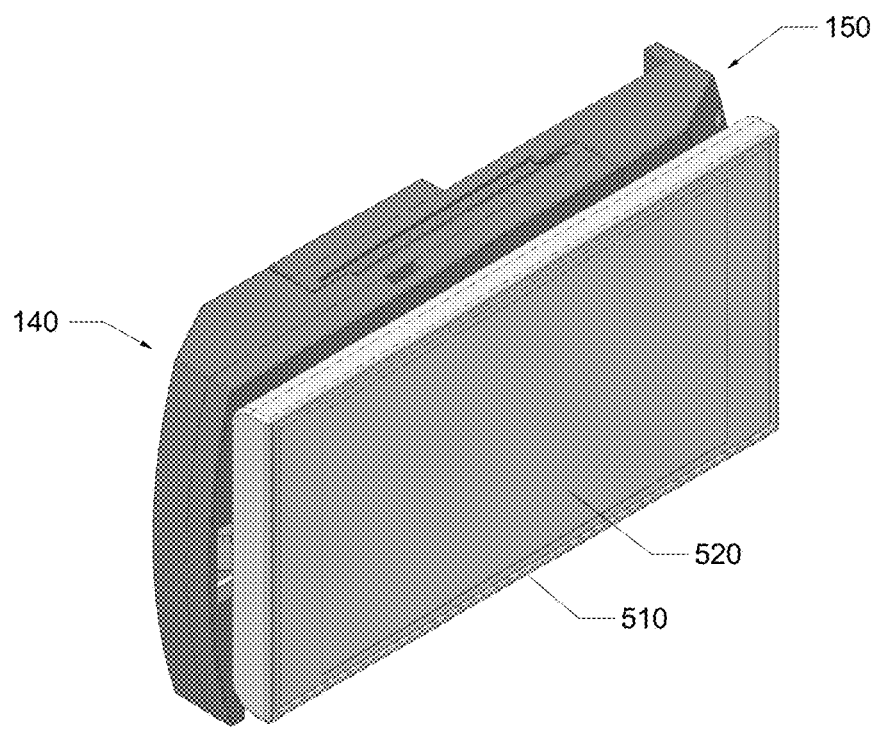

FIG. 6A shows the invention in use mode with smartphone 520 is attached, slid, tilted, and rotated to a user's preference. FIG. 6B shows the invention in folded mode with smartphone 520 attached and slid to be centered on paddles 140 and 150.

Figure 7A:
FIG. 7A through 7E show a display to a paired computer with a map of icons when the invention is in the various input modes with the paddles in various positions.

FIG. 7A shows a map of icons on the display of a paired computer when all the axes of rotation on both paddles are in the neutral position. The shaded icons highlight the activation events currently available by flexion of a digit.

Figure 7B:

FIG. 7B shows a map of icons on the display of a paired computer when the left paddle is pitched up and rolled out and the right paddle is pitched down and rolled out. The shaded icons highlight the activation events currently available by flexion of a digit. The icons on each key are rotated responsive to the paddle roll state.

Figure 7C:

FIG. 7C shows a map of icons on the display of a paired computer when the left paddle is yawed in and rolled in and the right paddle is yawed out and rolled in. The shaded icons highlight the activation events currently available by flexion of a digit. The icons on each key are rotated responsive to the paddle roll state.

Figure 7D:
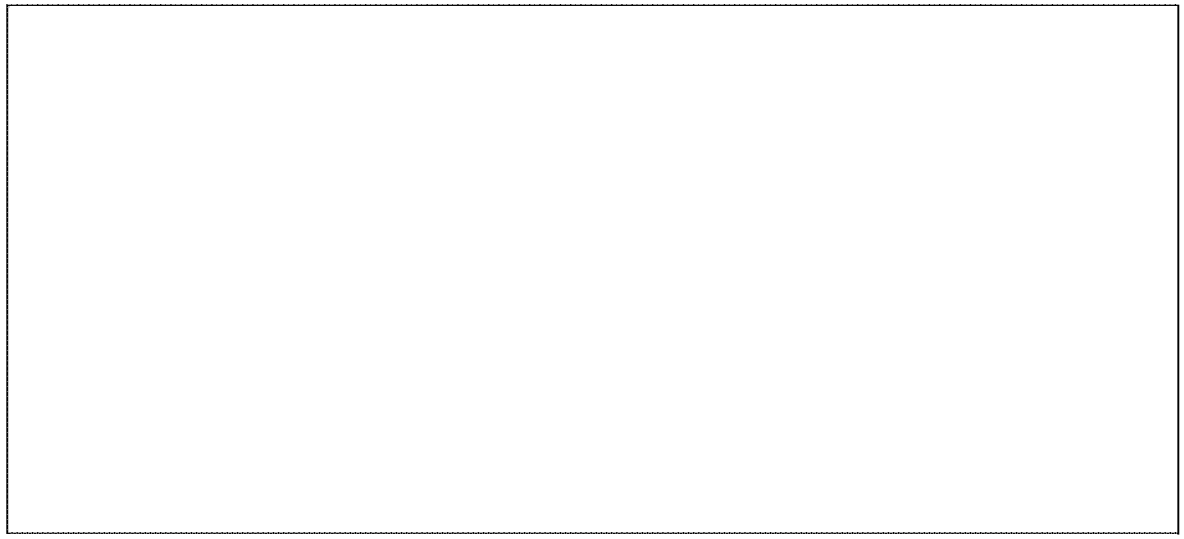

FIG. 7D shows the display when the pressure switch is activated by the user applying increased pressure pushing the paddles together. The display is blank while pressure is applied to indicate the invention is toggling between the key input and pointer input modes.

Figure 7E:
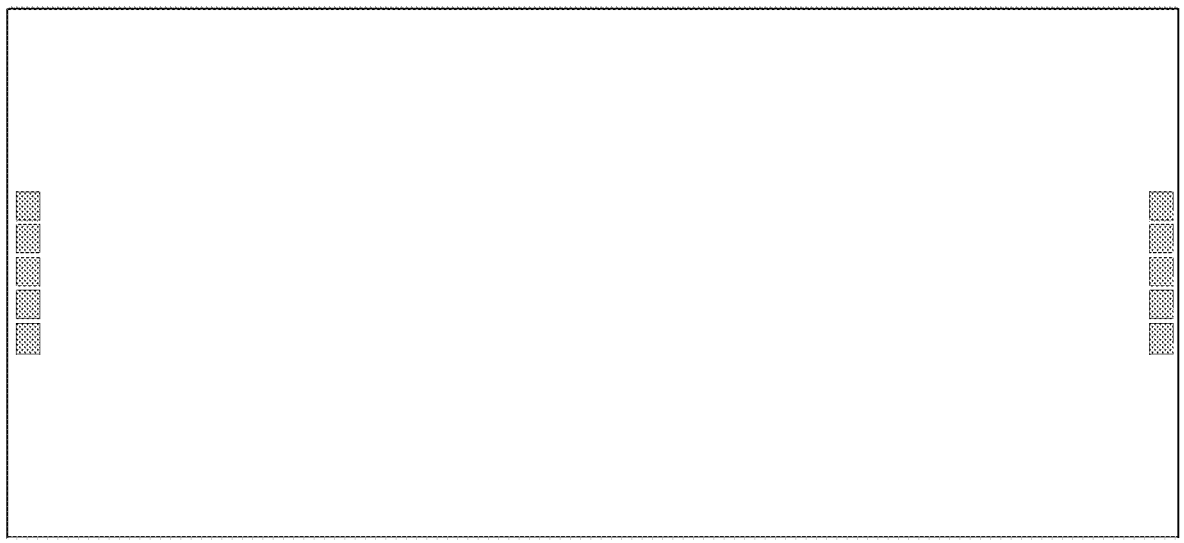

FIG. 7E shows a map of icons on the display of a paired computer when the invention is in pointer input mode. In the pointer input mode, the paddle movements manipulate a focus pointer on the display and the icons present five activation events available to the left hand and five activation events available to the right hand.

Many of the icons in FIG. 7 are blank. These blank icons can be assigned to other common computer input events such as "copy", "cut", "paste", etc. Furthermore, the programmable nature of the icons, as opposed to the legends printed on the keycaps on traditional keyboards, are easily changed to accommodate alternative languages. The icons can also be assigned alternative functions responsive to the context of the state of the computer. For example, when the computer focus is on a region that does not require keyboard input, the icons can be changed for launching other applications.

I claim:

1. An apparatus in communication with a paired computing device comprising:
    a left paddle shaped to fit in a user's left hand and a right paddle shaped to fit in a user's right hand;
    a tie bar having a first 3-axis pivot and a second 3-axis pivot, wherein the left paddle is connected to the left end of the tie bar via the first 3-axis pivot and the right paddle is connected to the right end of the tie bar via the second 3-axis pivot, and wherein each of the 3-axis pivots are positioned to press into the wells in a center of the user's palms;
    a back side of each paddle with an elevated section in constant contact with the user's palm and a recessed section with four keys positioned under the user's fingers wherein the user contacts and presses a key by flexion of a finger;
    a front of each paddle with a recessed section in constant contact the inside of the user's thumb and an elevated section below the user's thumb with a key on the top of the elevated section wherein the user contacts and presses the key by flexion of a thumb;
    an outside edge of each paddle in constant contact with the inside of the metacarpal-phalangeal joints of the user's hand.

2. The apparatus in claim 1 wherein the 3-axis pivot is a gimble with a vertical yaw axis for rotation of a paddle when the user flexes and extends their wrist, a roll axis perpendicular to the yaw axis for rotation of a paddle when the user pronates and supinates their wrist, and a pitch axis perpendicular to the yaw axis and perpendicular to the roll axis for rotation of a paddle when the user adducts and abducts their wrist, and wherein the yaw axis is perpendicular to the tie bar and the roll axis is at an acute angle relative to the tie bar so the tie bar remains stationary so the rotation around any axis of a first paddle does not affect the rotation around any axis of a second paddle.

3. The apparatus in claim 2 wherein sensors for each axis allows the apparatus to detect a transition to a neutral relaxed state, a transition to a clockwise torqued state, and a transition to a counterclockwise torqued state responsive to slight rotational movements due to rotational forces applied to the paddles by the user.

4. The apparatus in claim 3 wherein the paired computing device is expecting keyboard input so presents up to 135 icons along the left side of the display and up to 135 icons along the right side of the display, wherein up to 5 left side icons are highlighted based on the rotational states of the left paddle and up to 5 right side icons are highlighted based on the rotational states of the right paddle, and wherein a highlighted icon on the left side is activated by pressing a key on the left paddle and a highlighted icon on the right side is activated by pressing a key on the right paddle.

5. The apparatus in claim 3 wherein the paired computing device is expecting pointer control input so presents up to 5 icons on the left side of the display and up to 5 icons on the right side of the display, wherein an icon on the left side is activated by pressing a key on the left paddle and an icon on the right side is activated by pressing a key on the right paddle, and wherein pointer movement reports are sent to the paired computing device responsive to paddle rotational states.

6. The apparatus in claim 5 wherein:
pointer up reports at a first rate are sent upon a pitch up of one paddle and pointer up reports at a faster rate are sent upon a pitch up of both paddles;
pointer down reports at a first rate are sent upon a pitch down of one paddle and pointer down reports at a faster rate are sent upon a pitch down of both paddles.

7. The apparatus in claim 5 wherein:
pointer left reports at a first rate are sent upon a yaw in of the right paddle or a yaw out of the left paddle, and pointer left reports at a faster rate are sent upon yaw in of the right paddle and yaw out of the left paddle;
pointer right reports at a first rate are sent upon a yaw in of the left paddle or yaw out of the right paddle and pointer right reports at a faster rate are sent upon yaw in of the left paddle and yaw out of the right paddle.

8. The apparatus in claim 5 wherein:
zoom in reports at a first rate are sent upon a roll in of one paddle and zoom in reports at a faster rate are sent upon a roll in of both paddles;
zoom out reports at a first rate are sent upon a roll out of one paddle and zoom out reports at a faster rate are sent upon a roll out of both paddles.

9. The apparatus in claim 1 wherein the apparatus can be folded for storage by unlocking the gimbles from the paddles to allow paddles to align with the tie bar, unlocking the tie bar to allow one end of the tie bar to rotate relative to the other and allow it to telescope in so the paddles nest with one another.

10. The apparatus in claim 1 wherein the paired computing device is attached to the tie bar by a mount wherein the computing device can slide along the tie bar and rotate around the tie bar.

* * * * *